UNITED STATES PATENT OFFICE.

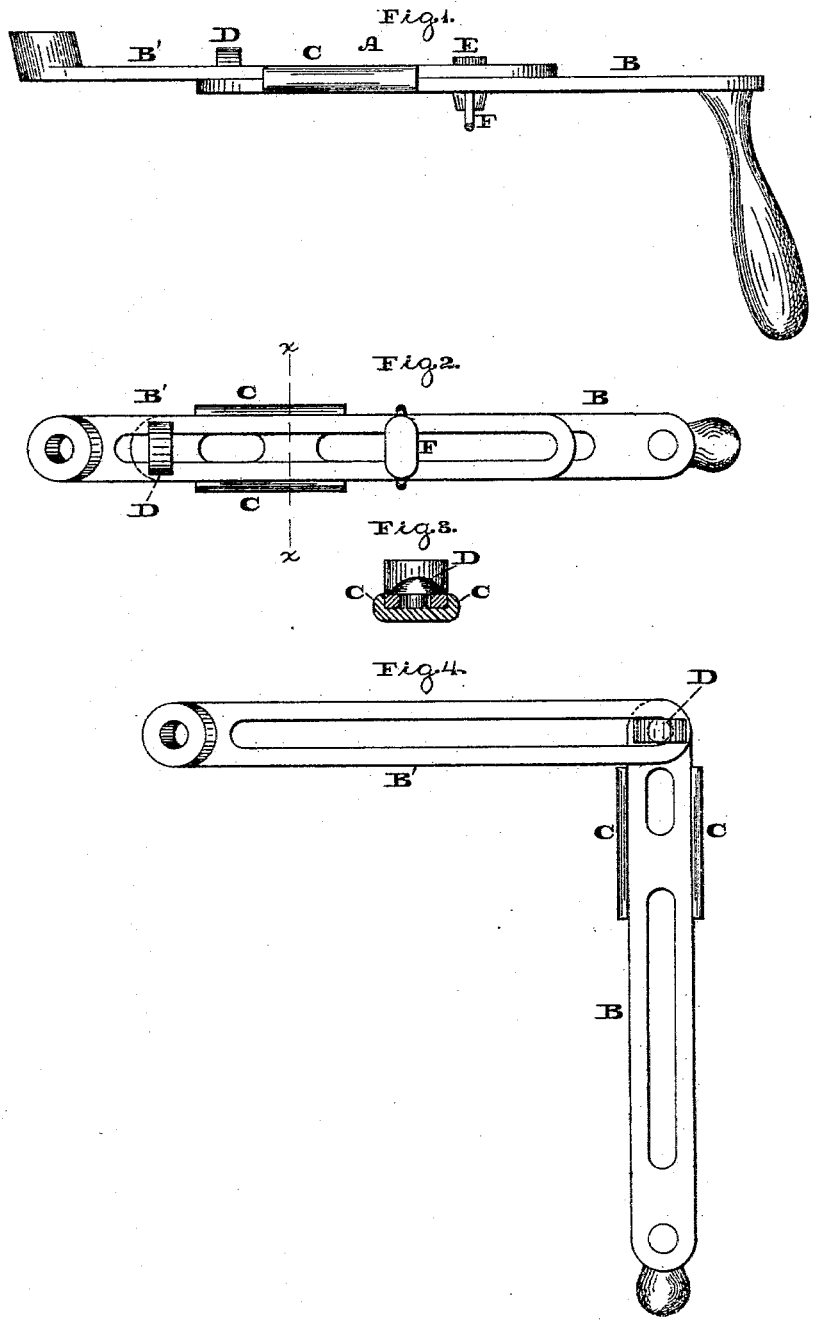

WILLIAM B. COATES, OF PHILADELPHIA, PENNSYLVANIA.

IMPROVEMENT IN CRANK-HANDLES.

Specification forming part of Letters Patent No. 210,669, dated December 10, 1878; application filed September 17, 1878.

*To all whom it may concern:*

Be it known that I, WILLIAM B. COATES, of the city and county of Philadelphia, and State of Pennsylvania, have invented a new and useful Improvement in Crank-Handles, which improvement is fully set forth in the following specification and accompanying drawings, in which—

Figure 1 is a side elevation of the crank-handle embodying my invention. Fig. 2 is a view of the inner face thereof. Fig. 3 is a transverse section in line $x\,x$, Fig. 2. Fig. 4 illustrates the manner of applying and separating the parts of the handle.

Similar letters of reference indicate corresponding parts in the several figures.

My invention consists of a crank handle or winch in which the power and sweep thereof may be adjusted, the same being formed of slotted arms, one of which is provided with a boss or means of attachment, and the other with a grasping-piece, flanges projecting from one arm and embracing the other arm, an overlapping button, and tightening-screw, whereby the handle may be readily lengthened and shortened, the connection of the arm made strong, and the handle prevented from breakage, regardless of the extent of adjustability.

Referring to the drawings, A represents a crank-handle, which may be of curved, angular, or right-lined form. This handle is formed of two arms, B B', which are slotted in the direction of their lengths, one arm being provided with means for attachment to the shaft or axis to be operated, and the other arm with a grasping-piece or handle proper.

From the sides of the arm B there project flanges C C, within which the arm B' is fitted, and from the inner face of said arm B there projects a button, D, whose head extends at a right angle to the longitudinal direction of the arms.

E represents a headed screw, whose shank is passed through the slots of the two arms, and has fitted to it a nut, F, for tightening purposes.

The operation is as follows: In order to connect the arms B B', the arm B' is fitted over the button D at a right angle to the arm B, as shown in Fig. 4. Then turn the arms so that they are in a right line, and slide the arm B' between the flanges C C. Insert the screw E through the slots of both arms, apply the nut F, and when the length of the crank-handle is adjusted by the degree of extension or separation of the arms the nut F is tightened.

It will be seen that the button D overlaps the walls of the slot of the arm B', the flanges C C embrace said arm B', and the screw and nut E F connect the two arms, whereby lateral and longitudinal movements of the two arms are prevented. The flanges C embrace the arm B', and thus strengthen the joint of the arms, and the button D and screw E, being at opposite ends of the flanges, still further increase the strength of the joint of the two arms, whereby the crank-handle will be strong and durable, and provision is made for the adjustment of the length of the arms relatively to the desired or required power or sweep of the handle.

If desired, the contiguous sides of the arm B and flanges C may be dovetailed, and the hold of the nut F increased by a jam-nut.

The separation of the arms B B' may be accomplished by loosening the nut F, removing the screw E, drawing out the arm B' to full extent, and turning said arm at a right angle to the arm B. The arm B' is then lifted clear of the button D, and thus entirely disconnected from the arm B.

Having thus described my invention, what I claim as new, and desire to secure by Letters Patent, is—

An adjustable crank-handle or winch, the same consisting of slotted arms, one of which is provided with an attaching end, and the other with a grasping-piece, the embracing-flanges, an overlapping button, and a screw, substantially as and for the purpose set forth.

WILLIAM B. COATES.

Witnesses:
A. F. RUTHERFORD,
JOHN A. WIEDERSHEIM.